United States Patent
Kamen et al.

(10) Patent No.: US 6,562,172 B1
(45) Date of Patent: May 13, 2003

(54) GLASS DECORATING METHOD USING INK COMPOSITIONS CONTAINING N-VINYL LACTAMS

(75) Inventors: Melvin Edwin Kamen, Highlands, NJ (US); Ming Hu, Piscataway, NJ (US)

(73) Assignee: Deco Patents, Inc., Edison, NJ (US)

( * ) Notice: Subject to any disclaimer, the term of this patent is extended or adjusted under 35 U.S.C. 154(b) by 0 days.

(21) Appl. No.: 09/134,825

(22) Filed: Aug. 17, 1998

(51) Int. Cl.$^7$ .......................... B44C 1/165; B44C 1/24; B32B 31/28; B41M 8/12; C08J 7/18
(52) U.S. Cl. .................. 156/234; 156/230; 156/233; 156/240; 156/241; 156/247; 156/273.3; 156/275.5; 156/277; 156/326; 427/146; 427/147; 427/148; 427/487; 427/511; 428/195; 428/204; 428/210; 428/914
(58) Field of Search ................. 156/230, 233, 156/234, 238, 240, 241, 273.5, 275.5, 326, 247, 277, 289, 272.2; 427/511, 146, 147, 148, 427; 428/195, 204, 209, 210, 914, 915

(56) References Cited

U.S. PATENT DOCUMENTS

| | | | | |
|---|---|---|---|---|
| 4,319,811 A | * | 3/1982 | Tu et al. ................. | 351/166 |
| 5,487,927 A | | 1/1996 | Kamen ..................... | 128/34.4 |
| 5,585,153 A | | 12/1996 | Kamen ..................... | 428/35.7 |
| 5,656,336 A | | 8/1997 | Kamen ..................... | 427/511 |
| 5,665,470 A | * | 9/1997 | Key et al. ................ | 428/378 |
| 5,750,592 A | * | 5/1998 | Shinozuka et al. ....... | 523/161 |

OTHER PUBLICATIONS

V–Pyrol: V–Cap: International Specialty Products, Jan. 1997.

* cited by examiner

Primary Examiner—J. A. Lorengo
(74) Attorney, Agent, or Firm—Pennie & Edmonds LLP

(57) ABSTRACT

A method for decorating a vitreous substrate with a radiation curable ink composition, comprising applying an ink composition comprised of an N-vinyl lactam to the glass in a predetermined design, the ink being operable when cured to bond to the vitreous substrate, curing the ink on the vitreous substrate by exposing it to the radiation by which it is curable, thereby bonding the ink composition to the substrate; and a method for decorating a vitreous substrate with hot stamping foil comprising applying an ink composition comprised of an N-vinyl lactam to the glass in a predetermined design, the ink being operable when cured to bond to the vitreous substrate, curing the ink on the vitreous substrate by exposing it to the radiation by which it is curable, thereby bonding the ink composition to the substrate, pressing a sheet of hot stamping foil against the substrate with a die heated to a temperature sufficient to cause a portion of the hot stamping foil to adhere to the heated, cured, ink design but not to the ink free areas of the vitreous substrate, removing the die, thereby leaving behind a portion of the foil adhered to the ink design but not to the ink-free areas of the glass.

20 Claims, No Drawings

GLASS DECORATING METHOD USING INK COMPOSITIONS CONTAINING N-VINYL LACTAMS

TECHNICAL FIELD

The invention is in the field of decorating glass with ultraviolet (UV) radiation curable compositions.

BACKGROUND OF THE INVENTION

Hot stamping is the heat transfer of a pigmented color or metallized surface from a polyester carrier onto a thermoplastic substrate. A heated die or roller is used to apply pressure to the hot stamping foil. The pressure forces the pigmented or metallized portion of foil into contact with the plastic substrate. The combination of heat and pressure softens the plastic substrate and activates the foil, causing it to adhere to the substrate. A vertical stamping or roll-on machine is used for the operation. The vertical stamping machine contains a heated die of brass, steel, or silicone rubber to transfer an area of a specific pattern as each part is placed into position. Roll-on methods utilize a silicone rubber roller or arced die to apply the foil in a continuous or batch process. Heat transfer can be achieved at temperatures of about 107° C.

Hot stamping is an efficient, inexpensive way to apply decoration to a thermoplastic substrate. Hot stamping cannot be used with glass because glass melts at a much higher temperature than most thermoplastic materials.

Generally decoration in the form of gold or silver leaf, color design, or printing, is applied to glass by a glazing process similar to that used with ceramics. The colored or metallic ink decoration is applied to the glass container by a variety of methods such as silk screen, printing, etc. The container is then subjected to extremely high kiln temperatures and the decoration is, in essence, baked on. Unfortunately this process is time consuming, expensive, energy intensive, and subject to safety considerations due to the high temperatures and gases necessary to operate the kilns.

Applying hot stamping foil to glass is disclosing in U.S. Pat. No. 5,708,047, which is hereby incorporated by reference. The glass is first printed with a radiation curable cycloaliphatic epoxide ink, and cured by exposure to radiation. Hot stamping foil is applied, and adheres to the cured ink design. However, the adhesion and durability of such decorated containers can always be improved. Accordingly, there is a need for ink compositions that provide improved adhesion and durability in the decoration of glass and other vitreous substrates.

SUMMARY OF THE INVENTION

The invention comprises a method for decorating a vitreous substrate with a radiation curable ink composition, comprising the steps of:
  a) applying an ink composition comprised of an N-vinyl lactam to the glass in a predetermined design, said ink being operable when cured to bond to the vitreous substrate,
  b) curing the ink on the vitreous substrate by exposing it to the radiation by which it is curable, thereby bonding the ink composition to the substrate, The invention additionally comprises a method for decorating a vitreous substrate with hot stamping foil comprising the steps of:
  a) applying an ink composition comprised of an N-vinyl lactam to the glass in a predetermined design, said ink being operable when cured to bond to the vitreous substrate,
  b) curing the ink on the vitreous substrate by exposing it to the radiation by which it is curable, thereby bonding the ink composition to the substrate,
  c) pressing a sheet of hot stamping foil against the substrate with a die heated to a temperature sufficient to cause a portion of the hot stamping foil to adhere to the heated, cured, ink design but not to the ink free areas of the vitreous substrate,
  d) removing the die, thereby leaving behind a portion of the foil adhered to the ink design.

DETAILED DESCRIPTION

All percentages mentioned herein are percentages by weight, unless otherwise indicated.

INK COMPOSITIONS USED IN THE METHOD

N-Vinyl Lactam

The ink compositions used in the method of the invention contain 10–60%, preferably 15–55%, more preferably 20–50% of an N-vinyl lactam. Preferably the N-vinyl lactam comprises a lactam having 4 to 6 ring carbon atoms. The N-vinyl lactam may be a liquid or solid at room temperature, and is a monomer, oligomer, or low molecular weight homo- or copolymer. Preferably the N-vinyl lactam has a molecular weight of about 100 to 150 daltons. Preferred N-vinyl lactams for use in the method of the invention are N-vinyl pyrrolidone and N-vinyl caprolactam. N-vinyl pyrrolidone may be purchased from International Specialty Products, Wayne N.J., and has the CAS Registry No. 86-12-0. This monomer has a molecular weight of 111 daltons, is a liquid at room temperature, and has a melting point of 17° C. N-vinyl caprolactam may also be purchased from International Specialty Products, and has the CAS Registry No. 2235-00-9. This monomer has a molecular weight of 139 daltons, and is a solid at room temperature, having a melting point of 35° C. In the preferred embodiment of the invention, the ink composition contains N-vinyl caprolactam.

Other Ethylenically Unsaturated Monomers or Oligomers

Preferably, the ink compositions also contain other ingredients such as one or more ethylenically unsaturated monomers or oligomers in addition to the N-vinyl lactam. A variety of other ethylenically unsaturated monomers or oligomers may be used, including those which cure by both free radical and cationic mechanisms.

Preferably the ink compositions contains 15–65%, preferably 20–60%, more preferably 25–50% by weight of the total composition of at least one ethylenically unsaturated monomer, oligomer, or low molecular weight homo- or copolymer in addition to the N-vinyl lactam. Suitable monomers may contain free acid groups, such as a carboxylic acid, sulfonic acid, or phosphoric acid group. The phrase "having a free acid group" means that the monomer unit has at least one free acid group, or the oligomer contains at least one monomer unit containing a free acid group, or if a homo- or copolymer, at least one monomer unit thereof contains at least one free acid group. Preferably the ink composition contains a monomer or oligomer, in particular an ethylenically unsaturated monomer or oligomer having at least one free acid group. Examples of preferred monomers or oligomers include those having carboxylic acid functional groups such as:

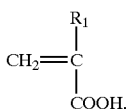

I wherein $R_1$ is H, a $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen.

Also suitable are ethylenically unsaturated monomers or oligomers having the unit formula:

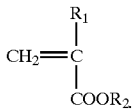

II wherein $R_1$ is as defined above, and $R_2$ is $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen; or 2-tetrahydrofuran; or X—COOH wherein X is a $C_{1-30}$ straight or branched chain alkyl, aryl, arylalkyl, or $(CH_2CH_2-O)_n Y$ COOH or $(CH_2CH_2CH_2-O)_n Y$ COOH wherein Y is a $C_{1-10}$ straight or branched chain alkyl and n is 1–10,000.

Preferably the monomer or oligomer is of Formula II wherein $R_1$ is H or $CH_3$, and $R_2$ is 2-tetrahydro-furan, or X—COOH wherein X is a $C_{1-10}$ straight or branched chain alkyl, more preferably ethyl. More preferably the composition comprises a mixture of Formula II monomers or oligomers, the first being wherein $R_2$ is 2-tetrahydrofuran, and the monomer or oligomer is tetrahydrofurfuryl acrylate, which preferably has a molecular weight of about 156 daltons and is a clear liquid having a specific gravity of about 0.872. This tetrahydrofurfuryl acrylate is sold by Sartomer Company under the tradename SR 285. The second preferred Formula II monomer or oligomer is wherein $R_2$ is also beta-carboxyethyl, e.g. as in beta-carboxyethyl acrylate, which is sold under the tradename B-CEA by UCB Radcure, Inc. B-CEA is a reactive monomer which contains both acrylate and carboxylic acid functionality, predominantly as the acrylic acid dimer, and, in particular, is a mixture of about 40% by weight B-carboxyethylacrylate, about 40% by weight higher homologs of acrylic acid, and about 20% by weight of acrylic acid. The B-carboxyethylacrylate component of this mixture has the following formula:

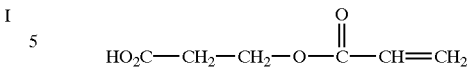

In addition, the ink composition may also contain carboxylic acid functional oligomers, such as aromatic acid methacrylate half esters and aromatic acid acrylate half esters, are also suitable acid functional oligomers for use in the method of the invention. Examples of such oligomers are partial esters of anhydride-containing copolymers such as those disclosed in U.S. Pat. No. 4,722,947, which is hereby incorporated by reference. These copolymers correspond to the following formula:

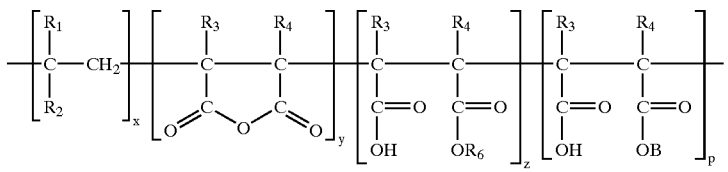

wherein $R_1$ and $R_2$ are each independently hydrogen, $C_{1-20}$ alkyl, aryl, alkaryl, cycloalkyl, or halogen; $R_3$, $R_4$, and $R_5$ (see below) are each independently hydrogen, $C_{1-20}$ alkyl, or aryl; and $R_6$ is the same or different and is alkyl, aralkyl, or an alkyl substituted aralkyl radical containing about 1 to 20 carbon atoms as well as oxyalkylated derivatives thereof; and the subscripts x, y, z, and p are each whole numbers such that the sum of x, y, z, and p may range from about 3 to 20; and x, p, and y are each equal to or greater than 1, and z may be 0; and B is —OAOCOCR$_5$CH$_2$ wherein A is a linear or branched divalent alkylene of from about 1 to 20 carbon atoms, or an oxyalkylated derivative thereof as described for $R_6$.

Particularly preferred aromatic partial esters of anhydride containing copolymers are those sold by Sartomer, Inc. under the Sarbox tradename, such as SB-400, SB-500, and SB-600. Particularly preferred is aromatic acid methacrylate half ester in ethoxylated trimethylolpropane triacrylate, which is sold by Sartomer, Inc. under the tradename Sarbox SB500E50.

Other suitable carboxylic acid functional monomers include acrylic acid, bisacrylamidoacetic acid, 4,4-bis(4-hydroxphenyl)pentanoic acid, 3-butene-1,2,3-tricarboxylic acid, 2-carboxyethyl acrylate, itaconic acid, methacrylic acid, 4-vinylbenzoic acid, and mixtures of these materials.

Examples of monomers containing sulfonic acid groups include 2-acrylamido-2-methyl-1-propanesulfonic acid; 2-methyl-2-propene-1-sulfonic acid, 2-propene-1-sulfonic acid, 4-styrenesulfonic acid, 2-sulfoethyl methacrylate, 3-sulfopropyldimethyl-3-methacrylamidopropyl ammonium inner salt, 3-sulfopropyl methacrylate, vinysulfonic acid, and so on.

Examples of monomers containing phosphoric acid functional groups include bis(2-methacryloxyethyl)phosphate, monoacryloxyethyl phosphate, and so on.

Other radiation curable monomers, oligomers, or low molecular weight homo- or copolymers, terpolymers, or graft or block copolymers which do not contain free acid groups are also suitable. Examples of suitable monomers include epoxides, cycloaliphatic epoxides, vinyl chloride, styrene, ethyl acrylate, vinyl acetate, difunctional acrylic monomers such as hydroxy alkyl acrylates, or hydroxy alkyl methacrylates, vinyl butyrate, vinyl methyl ether, methyl methacrylate, isobornyl acrylate, acrylonitrile, or mixtures thereof. Suitable polymers include oligomers, homo- or copolymers, terpolymers, graft copolymers of the above monomers provided they have a molecular weight of less than about 50,000, otherwise it is too difficult to effect polymerization, i.e. curing. Preferred are acrylate homopolymers or acrylate or methacrylate copolymers, preferably acrylate or methacrylate copolymers. Examples of such acrylate or methacrylate copolymers include epoxy acrylates, copolymers of propylene glycol and a dicarboxylic acid, urethane acrylates, and the like. Preferably, the compositions contain one or more polymerizable reactants selected from the group consisting of urethane acrylate copolymers, tripropylene glycol acrylate, epoxy acrylate, and mixtures thereof.

Pigment

The compositions used in the invention may contain 5–95%, preferably 5–50%, more preferably 8–35% by weight of the total composition of pigment. A wide variety of pigments are suitable including organic and inorganic pigments. Examples of such pigments are set forth in U.S. Pat. No. 5,178,952, which is hereby incorporated by reference. Inorganic pigments include extender pigments such are baryites, barium sulfate, calcium carbonate, talc, clay, alumina, titanium dioxide, white carbon, chinese white, zinc sulfide, lithopone, ultramarine, Prussian blue, cobalt, chrome oxide, viridian chrome green yellows, oranges, and reds, cadmium, chromium, iron oxides, carbon black, metallic pigments, aluminum powder, bronze powder, zinc chromate, strontium chromate, zinc dust, copper, and so on. Examples of suitable organic pigments include azo pigments, indolinones, isoindolinones, vat pigments, the Lakes, pthalocyanine pigments and so on. The preferred pigment to impart white color to the ink composition is titanium dioxide. Preferred red and yellow pigments are isoindolinones and pyrrolopyrrols as disclosed in U.S. Pat. Nos. 4,415,685; 4,579,949; 4,791,204; 4,666,455; 5,074,918; 4,783,540; 4,914,211; 4,585,878; as well as U.S. Pat. No. 5,571,359 of Kamen, et. al., all of which are hereby incorporated by reference. These pyrrolopyrrols are generally of the formula:

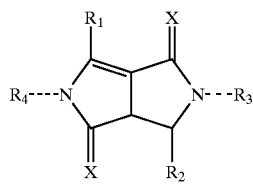

wherein $R_1$ and $R_2$ are each independently alkyl, arylalkyl, aryl, substituted or unsubstituted isocyclic or heterocyclic aromatic radicals; $R_3$ and $R_4$ are each independently H, substituted or unsubstituted alkyl, alkoxycarbonyl, aroyl (e.g. benzoyl), arylalkyl (e.g. benzyl), aryl (e.g. phenyl), alkanoyl, $C_{5-6}$ cycloalkyl, alkenyl, alkynyl, carbamoyl, alkylcarbamoyl, arylcarbamoyl, or alkoxycarbonyl; and X is O or S. Preferred is a compound wherein $R_1$ and $R_2$ are each independently phenyl or naphthyl, $R_3$ and $R_4$ are hydrogen, and X is O. Particularly preferred as a red pigment is pyrrolo 3,4-C pyrrol-1,4-dione, 2,5-dihydro-3,6-di-4-chlorophenyl which has a CAS number 84632-65-5 and is known by the common name C.I. pigment red 254. This pigment is commercially available from Ciba-Geigy Pigments Division, Newport, Del., under the tradename Irgazin DPP Red 80. Other Ciba-Geigy red pigments sold under the tradename Irgazin are also suitable.

Suitable isoindolinones are as set forth in U.S. Pat. Nos. 3,884,955, 3,867,404, 4,978,768, 4,400,507, 3,897,439 and 4,262,120 and 5,194,088 all of which are hereby incorporated by reference. Preferred isoindolinones are tetrachlorocyanobenzoic acid alkyl esters, particularly benzoic acid, 2,3,4,5-tetrachloro-6-cyano-methyl ester which is reacted with 2-methyl-1,3-benzenediamine and sodium methoxide. This pigment composition has the common name C.I. Pigment Yellow 109 and is available commercially from Ciba-Geigy Pigments Division, Newport Del. under the tradename Irgazin yellow 2GLTE. Other pigments in the Irgazin Yellow series as manufactured by Ciba-Geigy are also suitable.

Particularly suitable are blue pigments marketed by Ciba-Geigy under the tradename Irgazin Blue X-3367, or by Whittaker, Clark, & Daniels under the tradename Ultramarine Blue 5009.

Surfactant or Defoaming Agent

The ink compositions used in the invention also preferably contain about 0.01–10% of a defoaming agent or surfactant. Defoaming agents cause the ink to apply smoothly on the glass substrate without bubbles or unevenness. A wide variety of defoamers are suitable, such as polyether defoaming agents sold by BYK Chemie under the BYK tradename. Examples of such defoaming agents are alkylvinyl ether polymers set forth in U.S. Pat. No. 5,187,201, which is hereby incorporated by reference. Examples of other defoamers include polyethers such as BYK-052, BYK-053, and BYK-033. BYK-052 and -053 are polyethers such as polyethylene or polypropylene glycol ethers, and in particular, polyvinyl ethers. Also suitable is BYK-354 which is a polyacrylate solution, and BYK-022 which is a mixture of hydrophobic solids and foam destroying polysiloxanes in polyglycol. Preferably the polyether defoaming agent is an alkoxylated alkyl phenol, more particularly a mixtures of petroleum distillates and an ethoxylated alkyl phenol, such as that sold by BYK-Chemie under the tradename BYK-033.

Also suitable are various surfactants which may be cationic, anionic, amphoteric, zwitterionic, or nonionic. Suitable amphoteric surfactants are generally derivatives of aliphatic secondary or tertiary amines wherein one aliphatic radical is a straight or branched chain alkyl of 8 to 18 carbon atoms and the other aliphatic radical contains an anionic group such as carboxy, sulfonate, sulfate, phosphate, or phosphonate. Suitable zwitterionic surfactants include betaines, as well as those of the general formula:

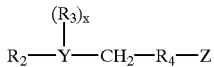

wherein $R_2$ contains an alkyl, alkenyl or hydroxy alkyl radical of from about 8 to about 18 carbon atoms, from 0 to about 10 ethylene oxide moieties and 0 or 1 glyceryl moiety; Y is selected from the group consisting of nitrogen, phosphorus, and sulfur atoms; $R_3$ is an alkyl or monohydroxyalkyl group containing about 1 to 3 carbon atoms; x is 1 when Y is a sulfur atom, and 2 when Y is a nitrogen or phosphorus atom; $R_4$ is an alkylene or hydroxyalkylene of from about 1 to about 4 carbon atoms, and Z is a radical selected from the group consisting of carboxylate, sulfonate, sulfate, phosphonate, and phosphate groups. Suitable anionic surfactants include alkyl ether sulfates and sulfonates, as well as succinates, succinimate, and olefin sulfonates.

Preferably, the surfactant is a nonionic surfactant. Nonionic surfactants are generally compounds produced by the condensation of alkylene oxide groups with a hydrophobic compound. Classes of nonionic surfactants are:

(a) Long chain dialkyl sulfoxides containing one short chain alkyl or hydroxy alkyl radical of from about 1 to 3 carbon atoms and one long hydrophobic chain which may be an alkyl, alkenyl, hydroxyalkyl, or ketoalkyl radical containing from about 8 to 20 carbon atoms, from 0 to 10 ethylene oxide moieties, and 0 or 1 glyceryl moiety.

(b) Polysorbates, such as sucrose esters of fatty acids. Examples of such materials include sucrose cocoate, sucrose behenate, and so on.

(c) Polyethylene oxide condensates of alkyl phenols, for example the condensation products of alkyl phenols having an alkyl group of 6 to 20 carbon atoms with ethylene oxide being present in amounts of about 10 to 60 moles of ethylene oxide per mole of alkyl phenol.

(d) Condensation products of ethylene oxide with the reaction product of propylene oxide and ethylene diamine.

(e) Condensation products of aliphatic alcohols having 8 to 18 carbon atoms with ethylene oxide, for example a coconut alcohol/ethylene oxide condensate having 10 to 30 moles of ethylene oxide per mole of coconut alcohol, the coconut alcohol fraction having 10 to 14 carbon atoms.

(f) Long chain tertiary amine oxides such as those corresponding to the general formula:

$$R_1R_2R_3NO$$

wherein $R_1$ contains an alkyl, alkenyl or monohydroxyalkyl radical ranging from about 8 to 18 carbon atoms in length, from 0 to about 10 ethylene oxide moieties, and from 0 to about 1 glyceryl moiety and $R_2$ and $R_3$ are each alkyl or monohydroxyalkyl groups containing from about 1 to about 3 carbon atoms.

(g) Long chain tertiary phosphine oxides corresponding to the general formula:

$$RR_1R_2PO$$

wherein R contains an alkyl, alkenyl, or monohydroxyalkyl radical having 8 to 18 carbon atoms, from 0–10 ethylene oxide moieties and 0 or 1 glyceryl moiety, and $R_2$ and $R_3$ are each alkyl or monohydroxyalkyl group containing from about 1 to 3 carbon atoms.

(h) Alkyl polysaccharides having a hydrophobic group of 6 to 30, preferably 10, carbon atoms and a polysaccharide group such as glucose, galactose, etc. Suitable alkyl polysaccharides are octyl, nonydecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses, and so on.

(i) Polyethylene glycol (PEG) glyceryl fatty esters, which are the reaction product of polyethylene glycol, glycerin, and fatty acids. Suitable PEG glyceryl fatty esters may be monoesters, diesters, or triesters. Such compounds are manufactured by Goldschmidt Corporation under the TAGAT tradename. Suitable monoesters include, for example, those having the general formula:

$$RC(O)OCH_2CH(OH)CH_2(OCH_2CH_2)_nOH$$

wherein n is 2–200 and RC(O)— is a hydrocarbylcarbonyl group wherein R is an aliphatic radical having 7 to 30, preferably 8–20 carbon atoms.

(j) Other nonionic surfactants that may be used include $C_{10-18}$ alkyl($C_{1-6}$)polyhydroxy fatty acid amides such as $C_{12-18}$ methylglucamides, N-alkoxy polyhydroxy fatty acid amides, N-propyl through N-hexyl $C_{12-18}$ glucamides and so on.

Other suitable nonionic surfactants include fluorinated nonionic surfactants. The term "fluorinated nonionic surfactant" means a fluorine containing compound having at least one liphophilic group or portion and at least one hydrophilic group or portion. Examples of such surfactants are set forth in U.S. Pat. No. 4,961,976 which is hereby incorporated by reference. Also suitable are fluorocarbon surfactants, such as those marketed under the Fluorad trademark by 3M Company. These fluorochemical surfactants include fluorinated alkyl esters, fluorinated alkyl polyoxyethylene ethanols, and the like. Fluorinated alkyl alkoxylates are marketed by 3M under the trademark FC-171.

The preferred nonionic surfactants for use in the present invention are polyethylene glycol glyceryl fatty esters of the formula $$RC(O)OCH_2CH(OH)CH_2(OCH_2CH_2)_nOH$$

wherein n is 2–200 and RC(O)— is a hydrocarbylcarbonyl group wherein R is an aliphatic radical having 8–20 carbon atoms. Particularly preferred is a polyethylene glycol glyceryl fatty acid monoester sold by Goldschmidt Corporation under the tradename Tagat S5, which is PEG-5 glycerylmonostearate. In the preferred embodiment of the invention Tegoglas T5 is used which is an aqueous solution of Tagat S5, sold by Goldschmidt Corporation.

Adhesion Promoter

The ink compositions used in the invention also preferably contain about 0.01–25%, preferably about 0.05–15%, more preferably about 0.1–5% of a silane adhesion promoter which will enhance adhesion of the cured resin to the vitreous surface. Examples of silanes are silane esters, vinyl silanes, methacryloxy silanes, epoxy silanes, sulfur silanes, amino silanes, or isocyanoto silanes. Suitable silanes include organofunctional silanes of the formula:

$$Y\text{----}(CH_2)_{\overline{n}}\text{---}SiX_{3-a}$$
$$|$$
$$(CH_3)_a$$

wherein n=0–3
a=0–2

$$Y = NH_2,\ CH_2\!=\!CH,\ CH_2\!=\!\underset{\underset{CH_3}{|}}{C}\!-\!COO\text{---},\ CH_3\!-\!NH\text{---},$$

$$NH_2\!-\!CO\!-\!NH\text{---},\ HS\text{---},\ Cl\text{---},\ NH_2(CH_2)_2NH\text{---},$$

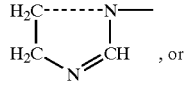 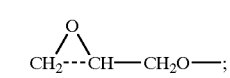

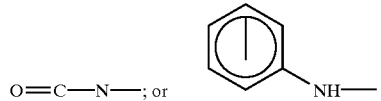

X is each independently $CH_3$, Cl, $OCOCH_3$, $OC_2H_4OCH_3$, $(OC_2H_4)_2OCH_3$, or —OR, where R is a $C_{1-20}$ straight or branched chain alkyl, preferably methyl or ethyl.

Silanes having this formula are commercially available under the Dynasylan trademark from Huls, America, Inc., Piscataway, N.J. or Osi Specialities Inc. Other organofunctional silanes such as those disclosed in U.S. Pat. No. 5,221,560, which is hereby incorporated by reference, are also suitable. Such organosilanes are acryloxyfunctional silanes including 3-methacryloxypropyltrimethoxysilane, 3-acryloxypropyltrimethoxysilane, 2-methacryloxyethyltrimethyoxysilane, 2-acryloxyethyltrimethyoxysilane, 3-methacryloxypropyltriethoxysilane, 3-acryloxypropyltrimethyoxysilane, 3-acryloxypropyltriethoxysilane, 2-methacryloxyethyltriethoxysilane, 2-methacryloxyethyltriethoxysilane, 2-acryloxyethyltriethoxysilane, etc. Suitable glycidoxy silanes include 3-glycidoxypropyltrimethoxysilane, 2-glycidoxyethyltrimethoxysilane, 3-glycidoxypropyltriethoxysilane, 2-glycidoxyethyltriethoxysilane, 3-glycidoxypropyltrimethyl silane, and so on. Preferred for use in the compositions of the invention are acryloxy-functional silanes, isocyanato silanes, and amino silanes. The preferred acryloxy-functional silane is 3-methacryloxypropyl trimethoxy silane, which is sold by Huls America, Inc. under the tradename DYNASYLAN MEMO. The preferred amino silane is sold by Huls America, Inc. under the tradename DYNASYLAN TRIAMO. The preferred isocyanoto silane is sold by Osi Specialities Inc., under the tradename A-1310. In the preferred ink compositions of the invention a mixture of the three silanes is preferred, generally 0.01–2% by weight of each.

Photoinitiator

The ink compositions preferably contain a photoinitiator which catalyzes the polymerization of the monomers upon exposure to the radiation by which the monomers are curable. There are generally two types of photoinitiators: free radical and cationic. Free radical initiators are more commonly used with ethylenically unsaturated monomers and oligomers, while cationic photoinitiators are used with epoxy or vinyl ether functional resins. Preferably, the compositions used in the invention contain free radical photoiniators. Suitable free radical-type photoiniators include carbonyl compounds such as ketones, acetophenones, benzophenones, and derivatives thereof. Examples of such materials include, for example, methyl ethyl ketone; benzophenone; benzyl dimethyl ketal; 1-hydroxycyclohexylphenylketone; diethyoxyacetophenone; 2-methyl-1-(methylethiophenyl)-2-(4-morpholinyl)-1-propanone; 2-benzyl-2-N,N-dimethylamino-1,4(4-morpholinophenyl)-1-butanone; 2,2-dimethoxy-2-phenyl acetophenone; 2-methyl-1-[4-(methylthio)phenyl]-2-morpholino propan-1-one; 2-hydroxy-2-methyl-1-phenyl-propan-1-one; 4-(2-hydroxyethoxy)phenyl-(2-hydroxy-2-methylpropyl)ketone; and a mixture of bis(2,6-dimethyoxybenzoyl)-2-4-4-trimethylpentyl phosphine oxide and 2-hydroxy-2-methyl-1-phenyl-propan-1-one. Preferred are 2-methyl-1-(methylethiophenyl)-2-(4-morpholinyl)-1-propanone a mixture of 25% bis(2,6-dimethyoxybenzoyl)-2-4-4-trimethylpentyl phosphine oxide and 75% 2-hydroxy-2-methyl-1-phenyl-propan-1-one, which are sold under the tradename Irgacure 907 and Irgacure 1800 by Ciba-Geigy.

Cationically curable monomers or oligomers may be used in the compositions of the invention. Examples of cationically curable monomers or oligomers include those with epoxy or epoxide groups, such as cycloaliphatic epoxides as disclosed in U.S. Pat. No. 5,708,047 or the bis-phenol-A epoxy resins disclosed in U.S. Pat. No. 5,656,336, both of which are hereby incorporated by reference. If cationically curable monomers or oligomers are used in the ink compositions, it is desirable to use cationic photoinitiators. The term "cationic photoinitiator" means a molecule or ingredient which, upon excitation, undergoes a photochemical transformation which efficiently generates a species capable of initiating cationic polymerization. If the ink composition of the invention is cured by UV or actinic radiation rather than electron beam it is desirable to add a cationic photoinitiator which catalyzes cross-linking of the resin upon exposure to the radiation to which the resin is sensitive. On the other hand, if the ink compositions of the invention are cured with electron beam it may be possible to dispense with the cationic photoinitiator. Various types of cationic photoinitiators are suitable. Both ionic cationic photoinitiators such as onium salts or organometallic salts are suitable as well as non-ionic cationic photoinitiators such as organosilanes, latent sulphonic acids and the like. Preferred are photosensitive onium salts, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974. Also suitable are ferrocenium salts such as those sold under the Irgacure tradename by Ciba-Geigy, in particular Irgacure 261. Sulphonyloxy ketones and silyl benzyl ethers are also good cationic photoinitiators. A detailed analysis of the mechanism of cationic curing is disclosed in "Photosensitized Epoxides as a Basis for Light-Curable Coatings" by William R. Watt, American Chemical Society Symposium, Ser. 114, Epoxy Resin Chemistry, Chapter 2, 1979, and in "Chemistry and Technology of UV and EB Formulation for Coatings, Inks, and Paints," Volume 3, entitled "Photoinitiators for Free Radical and Cationic Polymerization, K. K. Dietliker, pages 332–374 (1991), both of which are hereby incorporated by reference. Photosensitive onium salts are used as photoinitators in cationic curing, in particular, onium salts such as those disclosed in U.S. Pat. Nos. 4,058,401, 4,138,255, 4,161,478, 4,175,972, all of which are hereby incorporated by reference. For cationically curable monomers or oligomers triaryl sulphonium salts are most preferred, in particular triaryl sulphonium salts such as those sold by Union Carbide under the tradename Cyracure UVI 6990 and 6974. The photoiniator is generally present at about 0.1–15%, preferably about 0.5–12%, more preferably about 0.5–10% by weight of the total composition.

The preferred ink compositions used in the method of the invention comprise:

20–50% of an N-vinyl lactam,

10–65% of an ethylenically unsaturated monomer or oligomer in addition to the N-vinyl lactam, 0.01–10% of a nonionic surfactant.

THE METHOD

The term "die" means any object which is capable of being heated to a temperature sufficient to cause the hot stamping foil to adhere to the cured ink design, and is capable of compressing the hot stamping foil against the substrate. Suitable dies include dies of brass, steel, or silicone rubber found on traditional stamping machines, hand held rollers, silicone rubber rollers, arced dies, and so on.

The term "substrate" means glass, ceramic, or other similar vitreous substrates which are capable of decoration including containers, decorative objects, figurines, vases, windows, tiles, and so on.

The term "hot stamping foil" means, in general, a laminate comprised of a carrier material (often polyester, cellulose acetate, or another similar material capable of release), a release film, and a decorative or color coating, in that order. The decorative coat is usually color or a metallized coat. The decorative coat is usually color or a metallized coat. The metallized coat can be actual gold, silver, or aluminum, which is colored to look like gold or silver, or have holographic properties. The colored layer is most often applied by vacuum metallization. More specifically, hot stamping foil can be defined as a multilayer web comprised of a backing film carrier, a release coating, one or more protective top coatings, one or more color coatings, and a hot melt adhesive, in that order. In the general hot stamping process the hot melt adhesive layer of the foil is compressed against the substrate with a heated die. The hot melt adhesive layer adheres to the substrate and the application of heat also causes the release layer to release the backing film carrier from the protective op coat layer leaven the protective top coat layer exposed on the surface of the substrate. The release coating is either a wax or wax-like material, or a thermoplastic material which melts upon application of heat to release the protective top coat layer from the backing film carrier. Suitable thermoplastics used for release layers include ethylene vinyl acetate (EVA), acrylics, polyvinyl chlorides (PVC), polyamides, or similar thermoplastic materials as set froth in U.S. Pat. No. 5,104,719, which is hereby incorporated by reference. The protective top coating is usually a lacquer of some type which is capable of protective the color or metallized layer. The final layer is a hot melt adhesive which can be a wide variety of substances and is selected so that it is capable, upon application of heat, to adhere to the substrate to which it is applied. Generally thermoplastic materials such as EVA, PVC, and the like are suitable hot melt adhesives.

The term "actinic radiation" means light having a wavelength of 4 to 600 nm.

The term "ultraviolet radiation" or "UV" means light having a wavelength of 4 to 400, preferably 325 to 365 nm.

The method of the invention comprises decoration of vitreous substrates such as glass, tile, ceramic ware, and the like with hot stamping foil. The ink composition can be applied to the vitreous substrate in a variety of ways including silk screening or screen printing, offset printing, or any other application technique. Silk screening is preferred because it is adaptable to online production. Hand application using paintbrushes or other similar hand-help applicators may be employed where the ink is applied to a substrate such as a figurine or other highly decorative article which is not readily amenable to screen printing.

After the ink composition is applied to the substrate it is cured by exposure to the radiation by which it is curable. Electron beam may be used to cure the ink, although actinic radiation, preferably ultraviolet (UV) radiation is used. The ink on the decorated substrate is cured by exposure to UV light for a period of time to effect polymerization of the monomers present in the ink, usually ranging from fractions of a second to about 3 minutes, depending on how thickly the ink is applied to the substrate. UV conveyers such as those manufactured by Fusion Systems work well for this purpose. UV conveyers are comprised of a conveyer belt situated beneath a UV lamp. When the substrate is placed on the conveyer belt it moves along and is irradiated by the lamp. Obviously, where cure times are greater, the substrate the substrate can be passed repeatedly through several conveyers in line, or several times through the same conveyer. The conveyer is set up so that the substrate passes through for the appropriate amount of time to cure and adhere to the substrate.

After the ink has been cured it adheres to the substrate and provides durable, decorative indicia.

It may be desireable to apply hot stamping foil to the cured ink design. If so the substrate is stamped with hot stamping foil. In particular, the foil is compressed against the substrate with a heated die of an amount of time sufficient to cause the hot stamping foil to adhere to the cured ink design but not to the ink free areas of the glass. Generally the die should be heated to a temperature of 250 to 400° F., preferably 25° to 350° F. to cause adherence of the foil to the cured ink design. The die is compressed against the substrate for a period of time ranging from fractions of a second to several minutes depending on the die used, the temperature of the die, and the ink composition. When the heated die is removed the hot stamping foil is peeled away. A portion of the hot stamping foil, in particular the hot melt adhesive layer and the metallized or color layer, and the protective top coating, if present, in that order, remain affixed to the cured ink design such that the hot melt adhesive adheres to the cured ink design, followed by the colored coating layers, and the protective top coat layer on the surface of the container. The protective top coat may or may not contain part of the release coat layer, which is designed to release the color layer from the protective top coat.

The decoration which is applied to the substrate by this method is extremely durable and capable of withstanding the stringent conditions necessary to make it commercially acceptable.

The invention will be further described in connection with the following examples which are set forth for the purposes of illustration only.

EXAMPLE 1

Ink composition were made as follows:

|  | grams | w/w % |
|---|---|---|
| Vinyl caprolactam[1] | 35.0 | 32.20 |
| CAB 531-1[2] | 10.0 | 9.20 |
| Tetrahydrofurfuryl acrylate[3] | 20.0 | 18.40 |
| Beta-carboxylethylacrylate[4] | 15.0 | 13.80 |
| Black pearl pigment | 10.0 | 9.20 |
| Irgacure 1800[5] | 3.0 | 2.80 |
| Irgacure 907[6] | 3.0 | 2.80 |
| Foamex N[7] | 1.5 | 1.40 |
| A-1310[8] | 0.5 | 0.50 |
| 3-methacryloxypropyl trimethoxysilane[9] | 0.5 | 0.50 |
| Epoxy acrylate + tripropylene glycol acrylate[10] | 5.0 | 4.60 |
| SB500E50[11] | 5.0 | 4.60 |

[1]V-Cap/RC, CAS Reg. No 2235-00-9, International Specialty Products, Wayne, New Jersey
[2]Cellulose acetate butyrate, CAS Reg. No. 009004-36-8, Eastman Chemical Company, Kingsport, TN
[3]SR285, Sartomer Company Inc.
[4]B-CEA, UCB Radcure Inc.
[5]A 50:50 blend of bis(2,6-dimethyoxybenzoyl)(2,4,4-trimethylpentyl) phospine oxide and 1-hydroxycyclohexyl phenyl ketone, Ciba-Geigy Corp.
[6]2-methyl-1-[4-(methylthio)phenyl]-2-morpholino propan-1-one
[7]Polydimethylsiloxane dispersed in silicic acid, Goldschmidt Corporation, Hopewell, VA.
[8]Gamma-isocyanotopropyltriethoxysilane A-1310, Osi Specialities, Inc.
[9]DYNASYLAN MEMO, Huls America Inc. (Sivento)
[10]CN104, Sartomer Company
[11]Aromatic acid methacrylate ½ ester in ethoxylated trimethylolpropane triacrylate, Sartomer Company The ink composition was made by combining the ingredients and mixing well.

EXAMPLE 2

The ink composition of Example 1 was screened on glass cosmetic containers using a silk screen having 220 mesh. The ink was cured by exposure to UV radiation. The ink adhered well to the resulting decorated container.

EXAMPLE 3

Hot stamping foil was applied to a container decorated according to Example 2. The hot stamping foil was applied to the heated, cured design by compressing the foil against the ink with a hot compress. Hot stamping foil adhered to the cured ink design but not to the ink-free areas of the glass.

While the invention has been described in connection with the preferred embodiment, it is not intended to limit the scope of the invention to the particular form set forth but, on the contrary, it is intended to cover such alternatives, modifications, and equivalents as may be included within the spirit and scope of the invention as defined by the appended claims.

We claim:

1. A method for decorating a vitreous substrate comprising the steps of:

a) applying an ink composition comprised of an N-vinyl lactam and 0.01–25% of a silane adhesion promoter to the vitreous substrate in a design, said ink being operable when cured to bond to the vitreous substrate, and b) curing the ink on the vitreous substrate by exposing it to the radiation by which it is curable, thereby bonding the ink composition to the substrate.

2. The method of claim 1 wherein the N-vinyl lactam comprises a lactam having 4 to 6 ring carbon atoms.

3. The method of claim 2 wherein the N-vinyl lactam has a molecular weight of 100–150.

4. The method of claim 3 wherein the N-vinyl lactam is selected from the group consisting of N-vinyl pyrrolidone, N-vinyl caprolactam, and mixtures thereof.

5. The method of claim 4 wherein the N-vinyl lactam is a solid at room temperature.

6. The method of claim 5 wherein the N-vinyl lactam is N-vinyl caprolactam.

7. The method of claim 1 wherein the ink composition is curable by exposure to ultraviolet radiation.

8. The method of claim 1 wherein the ink composition comprises, by weight of the total composition:

20–50% N-vinyl lactam

10–60% of a second ethylenically unsaturated monomer or oligomer in addition to the N-vinyl lactam, and 0.01–10% of a nonionic surfactant.

9. The method of claim 8 wherein the second ethylenically unsaturated monomer or oligomer is selected from the group consisting of:

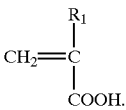

I wherein $R_1$ is H, a $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen;

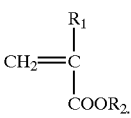

II wherein $R_1$ is as defined above, and $R_2$ is $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen; or 2-tetrahydrofuran; or X—COOH wherein X is a $C_{1-30}$ straight or branched chain alkyl, aryl, arylalkyl, or $(CH_2CH_2-O)_nY$ COOH or $(CH_2CH_2CH_2-O)_nY$ COOH wherein Y is a $C_{1-10}$ straight or branched chain alkyl and n is 1–10,000; and

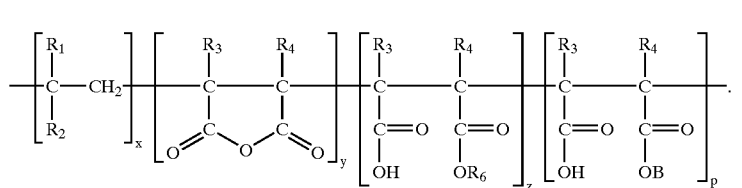

III wherein $R_1$ and $R_2$ are each independently hydrogen, $C_{1-20}$ alkyl, aryl, alkaryl, cycloalkyl, or halogen; $R_3$, $R_4$, and $R_5$ (see below) are each independently hydrogen, $C_{1-20}$ alkyl, or aryl; and $R_6$ is the same or different and is alkyl, aralkyl, or an alkyl substituted aralkyl radical containing about 1 to 20 carbon atoms as well as oxyalkylated derivatives thereof; and the subscripts x, y, z, and p are each whole numbers such that the sum of x, y, z, and p may range from about 3 to 20; and x, p, and y are each equal to or greater than 1, and z may be 0; and B is —OAOCOCR$_5$CH$_2$ wherein A is a linear or branched divalent alkylene of from about 1 to 20 carbon atoms, or an oxyalkylated derivative thereof as described for $R_6$.

10. The method of claim 8 wherein nonionic surfactant is a polyethylene glycol glyceryl fatty ester of the formula

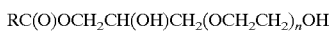

$RC(O)OCH_2CH(OH)CH_2(OCH_2CH_2)_nOH$ wherein n is 2–200 and RC(O)— is a hydrocarbylcarbonyl group wherein R is an aliphatic radical having 8–20 carbon atoms.

11. A method for decorating a vitreous substrate with hot stamping foil comprising the steps of:
   a) applying an ink composition comprised of an N-vinyl lactam and 0.01–25% of a silane adhesion promoter to the vitreous substrate in a design, said ink being operable when cured to bond to the vitreous substrate,
   b) curing the ink on the vitreous substrate by exposing it to the radiation by which it is curable, thereby bonding the ink composition to the substrate,
   c) pressing a sheet of hot stamping foil against the substrate with a die heated to a temperature sufficient to cause a portion of the hot stamping foil to adhere to the heated, cured, ink design but not to the ink free areas of the vitreous substrate, and
   d) removing the die, thereby leaving behind a portion of the foil adhered to the ink design.

12. The method of claim 11 wherein wherein the N-vinyl lactam comprises a lactam having 4 to 6 ring carbon atoms.

13. The method of claim 12 wherein the N-vinyl lactam has a molecular weight of 100–150.

14. The method of claim 12 wherein the N-vinyl lactam is selected from the group consisting of N-vinyl pyrrolidone, N-vinyl caprolactam, and mixtures thereof.

15. The method of claim 14 wherein the N-vinyl lactam is a solid at room temperature.

16. The method of claim 14 wherein the N-vinyl lactam is N-vinyl caprolactam.

17. The method of claim 11 wherein the ink composition is curable by exposure to ultraviolet radiation.

18. The method of claim 11 wherein the ink composition comprises:
   20–50% N-vinyl lactam
   10–60% of a second ethylenically unsaturated monomer or oligomer in addition to the N-vinyl lactam, and
   0.01–10% of a nonionic surfactant.

19. The method of claim 18 wherein the second ethylenically unsaturated monomer or oligomer is selected from the group consisting of:

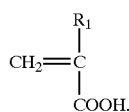

I wherein $R_1$ is H, a $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen;

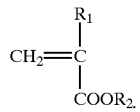

II wherein $R_1$ is as defined above, and $R_2$ is $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen; or 2-tetrahydrofuran; or X—COOH wherein X is a $C_{1-30}$ straight or branched chain alkyl, aryl, arylalkyl, or $(CH_2CH_2-O)_nY$ COOH or $(CH_2CH_2CH_2-O)_nY$ COOH wherein Y is a $C_{1-10}$ straight or branched chain alkyl and n is 1–10,000; and

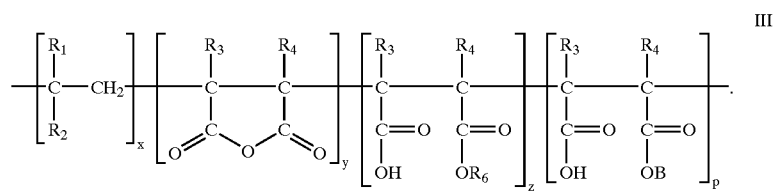

III wherein $R_1$ and $R_2$ are each independently hydrogen, $C_{1-20}$ alkyl, aryl, alkaryl, cycloalkyl, or halogen; $R_3$, $R_4$, and $R_5$ (see below) are each independently hydrogen, $C_{1-20}$ alkyl, or aryl; and $R_6$ is the same or different and is alkyl, aralkyl, or an alkyl substituted aralkyl radical containing about 1 to 20 carbon atoms as well as oxyalkylated derivatives thereof; and the subscripts x, y, z, and p are each whole numbers such that the sum of x, y, z, and p may range from about 3 to 20; and x, p, and y are each equal to or greater than 1, and z may be 0; and B is —OAOCOCR$_5$CH$_2$ wherein A is a linear or branched divalent alkylene of from about 1 to 20 carbon atoms, or an oxyalkylated derivative thereof as described for $R_6$.

20. The method of claim 17 wherein wherein nonionic surfactant is a polyethylene glycol glyceryl fatty ester of the formula RC(O)OCH$_2$CH(OH)CH$_2$(OCH$_2$CH$_2$)$_n$OH wherein n is 2–200 and RC(O)— is a hydrocarbylcarbonyl group wherein R is an aliphatic radical having 8–20 carbon atoms.

* * * * *

UNITED STATES PATENT AND TRADEMARK OFFICE
CERTIFICATE OF CORRECTION

PATENT NO. : 6,562,172 B1  
DATED : May 13, 2003  
INVENTOR(S) : Kamen et al.

It is certified that error appears in the above-identified patent and that said Letters Patent is hereby corrected as shown below:

Column 3,  
Line 5, please delete the period after the chemical structure

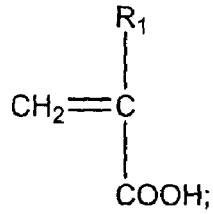

Line 30, please delete the period after the chemical structure

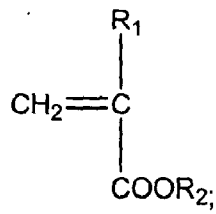

Column 14,  
Line 5, please delete the period after the chemical structure

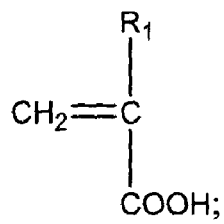

Line 15, please delete the period after the chemical structure

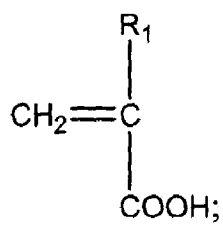

UNITED STATES PATENT AND TRADEMARK OFFICE
CERTIFICATE OF CORRECTION

PATENT NO. : 6,562,172 B1
DATED : May 13, 2003
INVENTOR(S) : Kamen et al.

It is certified that error appears in the above-identified patent and that said Letters Patent is hereby corrected as shown below:

Column 14 cont'd,
Line 35, please delete the period after the chemical structure

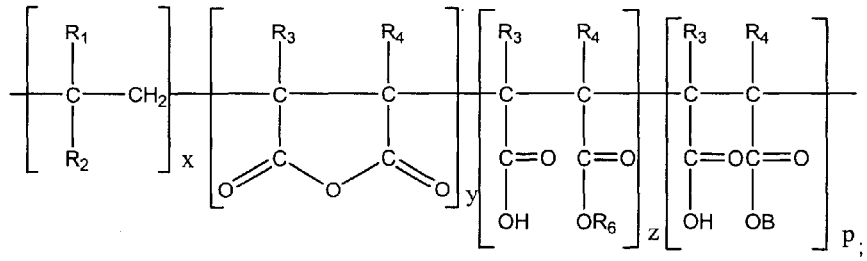

Column 15,
Line 60, please delete the period after the chemical structure

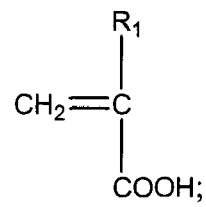

UNITED STATES PATENT AND TRADEMARK OFFICE
CERTIFICATE OF CORRECTION

PATENT NO.   : 6,562,172 B1
DATED        : May 13, 2003
INVENTOR(S)  : Kamen et al.

It is certified that error appears in the above-identified patent and that said Letters Patent is hereby corrected as shown below:

Column 16,
Line 10, please delete the period after the chemical structure

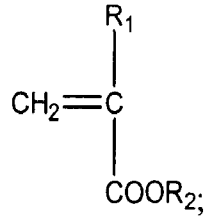

Line 30, please delete the period after the chemical structure

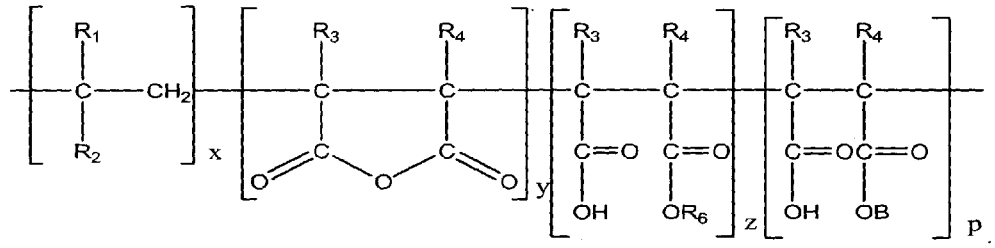

Signed and Sealed this

Sixteenth Day of September, 2003

JAMES E. ROGAN
*Director of the United States Patent and Trademark Office*